United States Patent [19]

Baghdachi et al.

[11] Patent Number: 4,954,598

[45] Date of Patent: Sep. 4, 1990

[54] FAST-CURE POLYURETHANE SEALANT COMPOSITION CONTAINING SILYL-SUBSTITUTED GUANIDINE ACCELERATORS

[75] Inventors: Jamil Baghdachi, Northville; Keith H. Mahoney, Grosse Pointe City, both of Mich.

[73] Assignee: BASF Corporation, Clifton, N.J.

[21] Appl. No.: 257,486

[22] Filed: Oct. 13, 1988

[51] Int. Cl.$^5$ ............................................. C08G 77/08
[52] U.S. Cl. ......................................... 528/22; 528/28;
528/38; 528/901; 556/420; 556/423; 556/424
[58] Field of Search ............................ 528/22, 28, 38;
556/424, 420, 423

[56] References Cited

U.S. PATENT DOCUMENTS

| | | | |
|---|---|---|---|
| 3,471,434 | 10/1969 | Pande | 260/37 |
| 3,622,529 | 3/1969 | Evans | 260/18 S |
| 3,632,557 | 1/1972 | Brode et al. | 528/29 |
| 3,665,026 | 5/1972 | Evans | 260/448.2 |
| 3,779,794 | 12/1973 | De Santis | 117/72 |
| 3,839,386 | 10/1974 | Lengnick | 260/448.2 |
| 3,979,344 | 9/1976 | Bryant et al. | 260/18 TN |
| 4,038,239 | 7/1977 | Coyner et al. | 260/77.5 |
| 4,180,642 | 12/1979 | Takago | 528/32 |
| 4,221,896 | 9/1980 | Endo | 528/28 |
| 4,248,993 | 2/1981 | Takago | 528/38 |
| 4,257,932 | 3/1981 | Beers | 260/18 |
| 4,358,575 | 11/1982 | Lampe | 528/17 |
| 4,395,526 | 7/1983 | White et al. | 528/18 |
| 4,469,831 | 9/1984 | Bueltjer et al. | 524/112 |
| 4,483,972 | 11/1984 | Mitchell | 528/18 |
| 4,645,816 | 2/1987 | Pohl et al. | 528/28 |
| 4,672,003 | 6/1987 | Letoffe | 428/447 |
| 4,707,515 | 11/1987 | Gilch et al. | 524/506 |

FOREIGN PATENT DOCUMENTS 0069256  1/1983  European Pat. Off. .

Primary Examiner—John C. Bleutge
Assistant Examiner—Ralph H. Dean, Jr.
Attorney, Agent, or Firm—Cary W. Brooks

[57] ABSTRACT

One-component, moisture-curable sealant compositions having fast cure times comprise a mixture of a silane-capped polyurethane polymer, an aminosilane cross-linking agent, and a silyl-substituted guanidine accelerator.

16 Claims, No Drawings

FAST-CURE POLYURETHANE SEALANT COMPOSITION CONTAINING SILYL-SUBSTITUTED GUANIDINE ACCELERATORS

FIELD OF THE INVENTION

This invention relates to room temperature moisture-curable polymer sealant compositions. More particularly, this invention concerns one-part room temperature curable polyurethane sealant compositions containing silyl-substituted guanidine accelerating agents having improved cure rates.

BACKGROUND OF THE INVENTION

Sealants are comprised of pigmented or unpigmented synthetic elastomeric polymers which, in the uncured state, constitute pourable or easily extrudable putty-like mastics. When cured, the sealants are transformed into elastomeric materials which have viscoelastic properties and can react to the relative motion of the structural elements which the sealant connects and seals. They also form a tight barrier against moisture, gases and chemicals. Such sealants find a wide variety of applications in the building trades industry and the automotive industry. In the latter case they are widely used to seal fixed window panels and taillight glass panels to coated auto, truck, and bus bodies.

Such sealants include compositions based on polysiloxane polymers as well as others which include polyurethane or polyacrylate polymers. Additionally, modern sealant compositions include one-part and two-part formulations which cure by a variety of chemical mechanisms. One-part sealant compositions generally contain an end-capped base polymer together with a reactive cross-linking agent and, typically, a curing catalyst which promotes the cross-linking reaction either when heated or exposed to atmospheric moisture. Upon application under normal conditions of temperature and moisture, one-part sealants react to form tough, pliable elastomeric seals.

Two-part sealant compositions, on the other hand, comprise two reactive components which are separately packaged and mixed just prior to or at the time of application and react upon mixing to form the semi-rigid sealant bead.

Two-part sealant compositions are less convenient to use since it is necessary to accurately premeasure and mix the components prior to use or accurately meter the components during application to insure correct proportions if the two components are applied together to form the sealant bead. For this reason, one-part sealants have found wider acceptance in the market. A number of such one-part moisture-curable sealant compositions are known. Because of their convenience and ease of use, there has been increasing demand for such sealants, especially if they possess both good shelf life and rapid curing rates.

To enhance the curing rates of moisture-cured sealants, a variety of curing catalysts and accelerators have been incorporated into such one-part compositions. The following United States patents disclose one-part moisture-curable polyurethane based sealant compositions and curing catalysts: 3,779,794 to De Santis (1,2,4-trimethylpiperazine); 3,979,344 to Bryant (dibutyl tin diacetate); 4,038,239 to Coyner, et al. (metallic salts of tin, lead, mercury, or Group VIII such as iron, organo-tin (IV) and organo-lead compounds, and organic amines such as trialkylamines, N-substituted piperidines, N,N'-substituted piperazines, pyridine); 4,469,831 to Bueltjer, et al. (aliphatic or aromatic carboxylic acids, toluenesulfonic acid); 4,672,003 to Letoffe (silane- or siloxane-substituted morpholines; and 4,707,515 to Gilch, et al. (organic and inorganic acids, salts of organic acids such as tin naphthenate, tin octoate, tin butyrate, dibutyltin dioctoate, dibutyltin dilaurate, dibutyltin diacetate, iron stearate, lead octoate, or organic amines).

Polysiloxane-based curable sealant compositions employing nitrogen-containing compounds as accelerators, adhesion promoters, cross-linking agents or end-blocking groups include the following: 3,471,434 to Pande, et al. (silicon-substituted oximino blocking groups); 3,622,529 and 3,665,026 to Evans (imidatosilanes); and 3,839,386 to Lengnick (oximino end-blocked disiloxanes).

Of particular relevance to the compositions of the present invention are the following U.S. Pat. Nos.: 4,180,642 and 4,248,993 to Takago and 4,395,526 to White, et al. which disclose organopolysiloxane compositions containing substituted guanidinyl accelerator compounds.

SUMMARY OF THE INVENTION

It has been found, in accordance with the present invention, that one-component polyurethane-based sealant compositions having fast cure rates at room temperature in the presence of moisture comprise a mixture of a silane-terminated polyurethane polymer, from about 0.2 to about 1.0 parts by weight of an aminosilane per 100 parts by weight of the polyurethane polymer, and from about 0.2 to about 1.0 parts by weight of a silyl-substituted guanidine accelerator per 100 parts of the polyurethane polymer.

The silane-capped polyurethane polymer has the structure

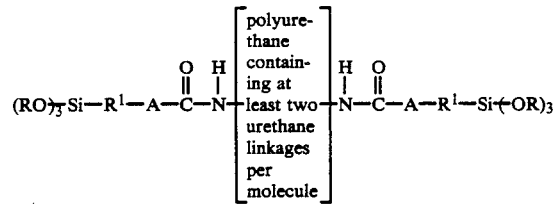

where R is lower alkyl of from 1 to 6 carbon atoms and $R^1$ is a divalent bridging radical selected from the group consisting of divalent hydrocarbon radicals, divalent hydrocarbon ether radicals, and divalent hydrocarbon amino radicals. The group A is selected from —S— and —$NR^2$— where $R^2$ is hydrogen or alkyl of from one to six carbon atoms. The aminosilane has the structure

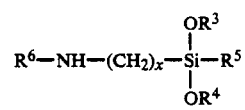

where x is an integer of from one to three, and $R^3$ and $R^4$ may be the same or different and are selected from alkyl of from one to four carbon atoms. The group $R^5$ is alkyl of from one to four carbon atoms or alkoxyl of from one to four carbon atoms and $R^6$ is hydrogen or —$(CH_2)_yNHR^7$ where $R^7$ is hydrogen or —$(CH_2)_zNH_2$.

The subscripts y and z may be the same or different and are integers of from one to three.

The silyl-substituted guanidine accelerator in the compositions of the present invention is selected from the group consisting of compounds having the structure

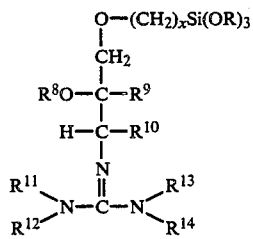

where x and R are as previously defined, and $R^8$, is hydrogen or

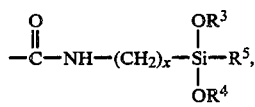

where $R^3$, $R^4$, $R^5$, and x are as defined above. $R^9$ and $R^{10}$ are hydrogen or, when taken together with the carbon atoms to which they are attached, form a saturated six-membered carbocyclic ring. $R^{11}$, $R^{12}$, $R^{13}$, and $R^{14}$ are independently hydrogen or alkyl of from one to four carbon atoms.

The composition may also contain other ingredients generally known to formulators of polymeric sealant compositions such as pigments, thixotropic agents, fillers, acidic or basic polymerization agents, and the like.

DETAILED DESCRIPTION OF THE INVENTION

As used throughout this specification and the appended claims, the term "alkyl" means a hydrocarbon residue derived from branched or unbranched alkane by removal of a single hydrogen atom. The term "alkoxyl" denotes alkyl groups attached through an oxygen ether linkage to the remainder of the parent molecule. The term "divalent hydrocarbyl" means a branched or unbranched hydrocarbon group derived by removal of two hydrogen atoms from a saturated or unsaturated acyclic hydrocarbon. The term "divalent hydrocarbaryl" denotes a group derived from the removal of two hydrogen atoms from hydrocarbons containing one or more carbocyclic aromatic rings including phenyl, alkylphenyl, and phenylalkyl and the like. The term "divalent cyclohydrocarbyl" means a group derived by the removal of two hydrogen atoms from a carbocyclic nonaromatic hydrocarbon ring including cyclohexane, alkylcyclohexane, and the like.

The sealant compositions of the present invention comprise a base silane-capped polyurethane polymer having a number average molecular weight in the range of from about 10,000 to about 30,000 having the structure

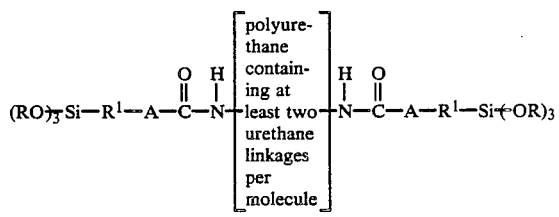

where R, $R^1$, and A are defined above. Such silane-capped polyurethane polymers are prepared by conventional polymerization techniques by reacting a polyether polyol having at least two free hydroxyl groups per molecule with an isocyanate compound having at least two isocyanate reactive groups per molecule. The polyether polyol and isocyanate compound are reacted in a weight ratio of about 8:1 to about 12:1, respectively. The starting polyether polyol preferably has a number average molecular weight of between about 1,000 and 5,000. One such preferred starting material is polypropylene glycol available as Polypropylene Glycol 2025 from Union Carbide Co., 270 Park Avenue, New York, NY 10017).

The starting isocyanate compound may be selected from a variety of materials known in the art for such purposes, but one such preferred material is toluene diisocyanate.

The copolymer formed by reaction of these two monomers is end-capped with a silane group having the structure $—A—R^1—Si—(OR)_3$. The group A is sulfur, >NH, or an alkylamino group in which the alkyl portion contains from one to six carbon atoms. The bridging group $R^1$ may be a divalent hydrocarbon radical, a divalent hydrocarbon radical containing one or more oxygen ether linkages, or a divalent hydrocarbon radical containing one or more >NH linkages. The end-capping of the polyurethane polymer is achieved by including in the reaction mixture containing the polyether polyol and isocyanate compound an aminosilane compound such as gamma-aminopropyl trimethoxysilane (A 1110 available from Union Carbide Corp., 270 Park Ave., New York, NY 10017).

The silane-capped polyurethane polymer is mixed with from about 20 to about 50 parts by weight of a pigmenting agent and/or filler such as carbon black per 100 parts by weight of the capped polyurethane polymer. Small amounts, ranging from about 0.25 to about 0.75 parts by weight of a thixotropic agent per 100 parts by weight of polyurethane polymer may also be added to adjust the flow characteristics of the sealant composition. A typical thixotropic agent suitable for this purpose is Thixseal 1085 available from NL Chemicals, Inc., Heightstown, NJ 08520.

Additional aminosilane is added to the sealant composition in amounts ranging between about 0.2 to about 1.0 parts by weight (preferably between about 0.4 to about 0.8 parts by weight) per 100 parts by weight of the polyurethane polymer. The aminosilane used is selected from compounds having the formula

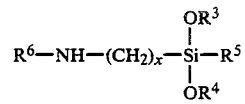

where x is an integer of from one to three and $R^3$ and $R^4$ may be the same or different and are selected from alkyl of from one to four carbon atoms. The group $R^5$ is alkyl of from one to four carbon atoms or alkoxyl of from one to four carbon atoms and $R^6$ is hydrogen or $-(CH_2)_yNHR^7$. $R^7$ is hydrogen or $-(CH_2)_zNH_2$ wherein y and z may be the same or different and are integers of from one to three. Suitable materials for this purpose are aminosilanes such as A 1110, A 1120, and A 1130, available from Union Carbide Corp. 270 Park Ave., New York, NY 10017.

The sealant compositions of this invention further contain from about 0.2 to about 1.0 parts by weight (preferably between about 0.2 to about 0.8 parts by weight) per 100 parts by weight of the polyurethane polymer of a silyl-substituted guanidine accelerator selected from compounds having the structure

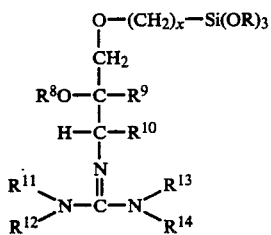

where x and R are as previously defined, and $R^8$, is hydrogen or

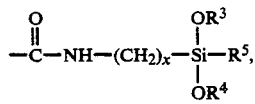

where $R^3$, $R^4$, $R^5$, and x are as defined above. $R^9$ and $R^{10}$ are hydrogen or, when taken together with the carbon atoms to which they are attached, form a saturated six-membered carbocyclic ring. $R^{11}$, $R^{12}$, $R^{13}$, and $R^{14}$ are independently hydrogen or alkyl of from one to four carbon atoms.

Examples of substituted guanidine accelerator compounds useful in the compositions of the present invention include the following:

N"-[2-Hydroxy-3-[3-(trimethoxy-silyl)propoxy]propyl]-N,N,N',N'-tetramethylguanidine:

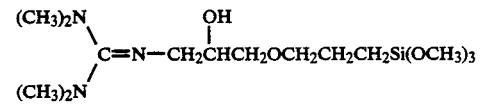

N"-[2-Hydroxy-3-[3-(ethoxydimethylsilyl)propoxy]-propyl]-N,N,N',N'-tetramethylguanidine:

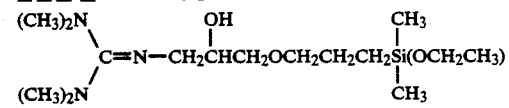

N"-[2-Hydroxy-3-[3-(diethoxymethylsilyl)propoxy]-propyl]-N,N,N',N'-tetramethylguanidine:

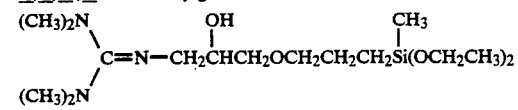

N"-[4-[2-(trimethoxysilyl)ethyl]-2-hydroxycyclohexyl]-N,N,N',N'-tetramethylguanidine:

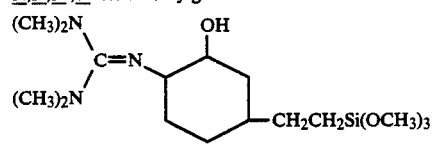

[3-(Triethoxysilyl)propyl]carbamic acid, [2-[[bis(dimethylamino)-methylene]amino]-1-[[3-(trimethoxysilyl)propoxy]methyl]ethyl]-ester:

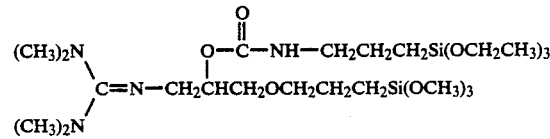

[3-(Triethoxysilyl)propyl]carbamic acid, [2-[[bis(dimethylamino)-methylene]amino]-1-[[3-(ethoxydimethylsilyl)propoxy]methyl]-ethyl]ester:

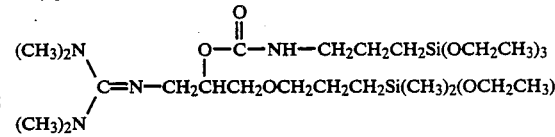

[3-(Triethoxysilyl)propyl]carbamic acid, [2-[[bis(dimethylamino)-methylene]amino]-1-[[3-(diethoxymethylsilyl)propoxy]methyl]-ethyl]ester:

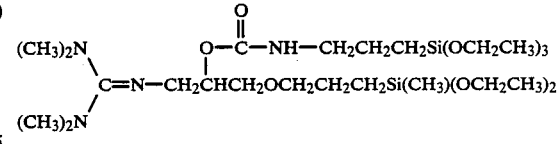

and

[3-(Triethoxysilyl)propyl]carbamic acid, [2-[[bis(dimethylamino)-methylene]amino]-5-[2-(trimethoxysilyl)ethyl]]cyclohexyl ester:

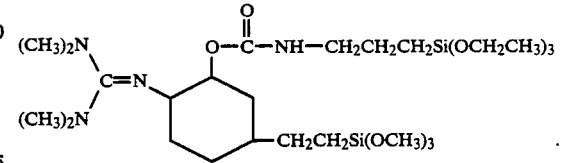

Silyl-substituted guanidine compounds of the type suitable for use in sealant compositions of the present invention are made by reacting the desired starting guanidine compound with the appropriate glycidyl ether of an alkylalkoxysilane compound in an aprotic inert polar organic solvent such as 1,1,1-trichloroethane at reflux temperature. The reaction is carried out for a period sufficient to effect substantially complete reaction between the two starting materials, typically for about two to six hours.

The starting glycidyl ethers of alkylalkoxysilanes are commercially available from Dynamit Nobel Chemicals, Silanes & Silicones Group, Bartram Road, Bristol, PA 19007, USA. The starting substituted guanidine compounds are commercially available from such sources as Aldrich Chemical Co., 940 West St. Paul Ave., Milwaukee, WI, 53233 USA or are easily synthesized by conventional methods known to practitioners of the organic chemical arts.

While not adhering to any particular theory to the exclusion of others, it is believed that the function of the silyl-substituted guanidine compound is at least threefold: first, the silyl-substituted guanidine compound is thought to be instumental in accelerating the curing rate of the polymeric composition; second, it is believed to promote the adherence of the resulting elastomer; and third, the amine functionality present in the substituted guanidine compounds is believed to act as an acid scavenger in the composition, promoting its shelf-life.

It has been found in accordance with the present invention that the inclusion of such substituted guanidine accelerators in the sealant compositions significantly increases the cure rates over the cure rates for similar sealant compositions which lack such accelerator compounds, as can be seen from the data provided in the following Table. Enhanced cure rates provide an important advantage when the sealants of this invention are employed, for example, in sealing fixed window panels and taillight glass panels to motor vehicle bodies where slowly curing sealants may present problems in a continuous production assembly line operation.

Testing Procedures

The lap shear strength of several materials prepared in accordance with the teachings of the present invention were tested according to the following method. In each instance, shear strength test plates were prepared by priming pairs of glass and steel plates, each about 1 inch by 4 inches by 0.32 inches (2.54 cm×0.81 cm), with a primer of the type disclosed in U.S. Pat. No. 3,979,344 to Bryant, et al. A sealant bead 1 inch long by 0.25 inches wide by 5/16 inches thick (2.54 cm×0.64 cm×0.79 cm) was then applied to each plate over the sealant primer along one of the one-inch edges of the test plates. The plates were then pressed together so that the sealant bead was about 0.25 inches (0.64 cm) thick.

The sealant bead applied to the bonded test plates was allowed to cure at room temperature and 50% relative humidity for periods which varied between three hours and seven days. After the appropriate cure time in each case, the shear strength of each sealant bead was tested on an Instron testing machine by pulling in a direction parallel to the faces of the bonded test plates. The results of these tests, along with other properties of the tested compositions, appear in the following Table.

TABLE

Shear Strength and Properties of Sealant Composition of The Present Invention

| Example | Property | Value | |
|---|---|---|---|
| 4 | Lap Shear Strength After 3 hours | 95 (655 | psi kP) |
| | Lap Shear Strength After 24 Hours | 408 (2813 | psi kP) |
| | Lap Shear Strength After 48 Hours | 597 (4116 | psi kP) |
| | Lap Shear Strength After 7 Days | 888 (6122 | psi kP) |
| | Tack-free time (cured at 50% relative humidity) | 30 | minutes |
| | Tensile Strength (ASTM D1002) | 1110 (7653 | psi kP) |
| | Elongation | 225% | |
| | Hardness (Shore A Durometer, ASTM D2240) | 57 | |
| | Tear Strength (ASTM D 624-86) | 175 | |
| 5 | Lap Shear Strength After 3 Hours | 101 (696 | psi kP) |
| | Lap Shear Strength After 24 Hours | 400 (2758 | psi kP) |
| | Lap Shear Strength After 48 Hours | 575 (3864 | psi kP) |
| | Lap Shear Strength After 7 Days | 924 (6371 | psi kP) |
| | Tack-free time (cured at 50% relative humidity) | 25 | minutes |
| | Tensile Strength (ASTM D1002) | 1050 (7239 | psi kP) |
| | Elongation | 225% | |
| | Hardness (Shore A Durometer, ASTM D2240) | 58 | |
| | Tear Strength (ASTM D 624-86) | 175 | |
| 6 | Lap Shear Strength After 3 Hours | 14 (97 | psi kP) |
| | Lap Shear Strength After 24 Hours | 341 (2351 | psi kP) |
| | Lap Shear Strength After 48 Hours | 400 (2758 | psi kP) |
| | Lap Shear Strength After 7 Days | 780 (5378 | psi kP) |
| | Tack-free time (cured at 50% relative humidity) | 90 | minutes |
| | Tensile Strength (ASTM D1002) | 900 (6205 | psi kP) |
| | Elongation | 250% | |
| | Hardness (Shore A Durometer, ASTM D2240) | 58 | |
| | Tear Strength (ASTM D 624-86) | 180 | |
| 7 | Lap Shear Strength After 3 Hours | 85 (586 | psi kP) |
| | Lap Shear Strength After 24 Hours | 435 (2899 | psi kP) |
| | Lap Shear Strength After 48 Hours | 584 (4027 | psi kP) |
| | Lap Shear Strength After 7 Days | 853 (5881 | psi kP) |
| | Tack-free time (cured at 50% relative humidity) | 30 | minutes |
| | Tensile Strength (ASTM D1002) | 950 (6550 | psi kP) |
| | Elongation | 300% | |
| | Hardness (Shore A Durometer, ASTM D2240) | 54 | |
| | Tear Strength (ASTM D 624-86) | 180 | |
| 8 | Lap Shear Strength After 3 Hours | 41 (283 | psi kP) |
| | Lap Shear Strength After 24 Hours | 389 (2682 | psi kP) |
| | Lap Shear Strength After 48 Hours | 435 (2999 | psi kP) |
| | Lap Shear Strength After 7 Days | 800 (5516 | psi kP) |
| 9 | Lap Shear Strength After 3 Hours | 138 (951 | psi kP) |
| | Lap Shear Strength After 24 Hours | 575 (3964 | psi kP) |
| | Lap Shear Strength After 48 Hours | 912 (6288 | psi kP) |
| | Lap Shear Strength After 7 Days | 950 (6550 | psi kP) |
| | Tack-free time (cured at 50% relative humidity) | 10 | minutes |
| | Tensile Strength (ASTM D1002) | 1200 (8274 | psi kP) |
| | Elongation | 200% | |
| | Hardness (Shore A Durometer, ASTM D2240) | 60 | |

TABLE-continued

Shear Strength and Properties of Sealant
Composition of The Present Invention

| Example | Property | Value |
|---|---|---|
| | Tear Strength (ASTM D 624-86) | 160 |

As can be seen by comparison of the data for Examples 6 (control no accelerator) and 4, 5, 7, 8, and 9 (accelerator in various concentrations), the sealant compositions have a much faster cure rate when the accelerators of the present invention are a component of the composition. For instance, Example 4 contained a preferred accelerator of the invention, while in Example 6 the composition was identical, except that the accelerator was missing. After three hours of curing, the lap shear strength of the material of Example 4 was almost seven times as great as that of Example 6. The difference was even greater between Examples 9 and 6. Example 9 contained a preferred accelerator of the present invention at the higher concentration of 0.8 parts by weight based on 100 parts by weight of the base polymer composition. After three hours of curing at room temperature at 50% relative humidity, the composition of Example 9 had nearly ten times the lap shear trength of the accelerator-free control composition In Example 7, the aminosilane adhesion promoter was omitted to test the resulting effect, and the data indicate that there were slight differences due to the omission on the cure rate and other properties of the resulting composition (such as percent elongation). (The presence of the aminosilane is preferred, however, to enhance other desirable properties of the final sealant composition such as adhesion.)

The following examples are provided to enable one skilled in the art to practice the present invention. These examples are merely illustrative of the present invention and are not to read as limiting the scope of the invention which is defined by the appended claims.

PREPARATION OF STARTING MATERIALS

Example 1

Preparation of Base Polyurethane Polymer

A silane-capped polyurethane polymer of the type described in U.S. Pat. No. 3,632,557 was prepared as follows:

| A. | Niax PPG 2025 ONE (2000 Molecular weight polyether polyol available from Union Carbide Corp., 270 Park Ave., New York, NY 10017) | 2001.00 g |
| | Hylene TM (80:20 Grade toluene diisocyanate available from E. I. duPont de Nemours & Co., Wilmington, DE 19898) | 204.00 g |
| | Glacial acetic acid | 0.55 g |
| | Dibutyltin diacetate | 0.45 g |
| B. | Anhydrous toluene | 110.00 g |
| C. | Anhydrous toluene | 81.00 g |
| | Silane A 1110 (gamma-Aminopropyl)trimethoxy silane available from Union Carbide Corp., 270 Park Ave., New York, NY 10017) | 68.30 g |
| D. | Anhydrous methanol | 273.00 g |

The components of A above were mixed and heated to 155° F. (68.3° C.) under anhydrous conditions and maintained at that temperature for fifty-five minutes. At the end of that time, B was added. Over the next forty-five minutes, the temperature of the mixture was gradually reduced to 105° F. (40.6° C.) and heating was continued for two and one-quarter hours. At the end of this time, C was added to the mixture and the resulting mixture was heated at 150°-165° F. (65.6°-73.9° C.) for an additional two and one-quarter hours. During this time, samples of the reaction mixture were tested for free isocyanate functional groups. When the tests indicated no residual free isocyanate, D was added and the mixture heated under reflux for a short time. The mixture was degassed and cooled to room temperature.

Example 2

Preparation of
N"-[2-Hvdroxv-3-3-(trimethoxvsilvl)-propoxy]propyl]-N,N,N',N',-tetramethvlguanidine

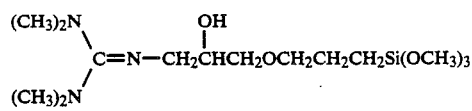

In a two-liter, four-necked flask fitted with a thermometer, condensor, argon gas inlet tube and dropping funnel were introduced 200 g of dry trichloroethane and 230.36 g (2 mol) of 1,1,3,3-tetramethylguanidine. The mixture was heated to reflux, and 234.6 g (1 mole) of gamma-glycidoxypropyltrimethoxysilane were then added in small portions to the flask. When addition was complete the mixture was stirred and heated for an additional six hours.

At the end of this time, the mixture was cooled to room temperature and the solvent was distilled from the mixture at ambient pressure. The residue was then distilled at reduced pressure to yield a fraction boiling at 50°-55° C. at 11 mm Hg (1.47 kPa) which consisted mainly of 1,1,3,3-tetramethylguanidine which was discarded. Continued distillation at reduced pressure yielded a crude fraction of the title compound, bp range 120°-154° C. at 5 mm Hg (0.67 kPa). This fraction was redistilled to yield 149 g (43% of theoretical) of N"-[2-hydroxy-3-[3-(trimethoxysilyl)propoxy]propyl]-N,N,N',N'-tetramethylguanidine, as a colorless liquid, bp range 145°-154° C. at 5 mm Hg (0.67 kPa).

The infrared spectrum of the product exhibited absorption peaks at 3300 cm$^{-1}$ (hydroxyl), 1040 cm$^{-1}$ (—Si—OCH$_3$), 1624 cm$^{-1}$ (—C=N), and 1200 cm$^{-1}$ (—N—CH$_3$).

Example 3

Preparation of [3-(Triethoxysilyl)propyl]carbamic Acid, [2-[[bis (Dimethylamino)methylene]amino]-1-[[3-(trimethoxysilyl)propoxy]methyl]ethyl] Ester

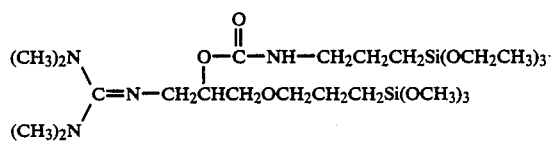

A ten gram sample of N"-[2-hydroxy-3-[3-(trimethoxysilyl)propoxy]propyl]-N,N,N',N'-tetramethylguanidine, prepared in Example 2, was dissolved in 5 g of toluene. To this solution was added, under a stream of argon gas, 7.1 g of 3-isocyanatopropyltriethoxysilane.

The resulting mixture was stirred at ambient temperature for one hour. At the end of this time, analysis of the reaction mixture by infrared spectroscopy indicated the absence of hydroxyl function. The reaction mixture, containing 71% by weight of [3-(triethoxysilyl)propyl]-carbamic acid, [2-[[bis(dimethylamino)methylene]amino]-1-[[3-(trimethoxysilyl)propoxy]methyl]ethyl]ester, was used without further purification as an accelerator.

PREPARATION OF SEALANT COMPOSITIONS

Example 4

Preparation of Sealant Composition Containing Accelerator of Example 2

A five gallon Meyers mixer with dual mixing blades was charged with 100 parts by weight of the silane-terminated polyurethane base polymer composition of Example 1 and thoroughly mixed for five minutes under a slight vacuum with 8 parts by weight of anhydrous methanol.

To this mixture was then added 0.5 parts by weight of adhesion promoter, N-beta-aminoethyl-gamma-aminopropyl trimethoxysilane, (available as Silane A1120 from Union Carbide Company, 270 Park Avenue, New York, NY 10017), 0.5 parts by weight of a rheology control agent, Thixseal 1084 (available from NL Chemicals, Inc, Heightstown, NJ 08520), 0.5 parts by weight of DBTDA anti-oxidant (available as anti-oxidant AO 2246 from American Cyanamide Co., Bound Brook, NJ 08805), and 0.1 parts by weight of dibutyltin diacetate. The resulting mixture was stirred for ten minutes under slight vacuum, after which time 0.1 parts by weight of N"'-[2-hydroxy-3-[3-(trimethoxysilyl)propoxy]-propyl]-N,N,N',N'-tetramethylguanidine were added as an accelerating agent. Carbon black (40 parts by weight) which had been previously dried to less than 0.05% by weight moisture content, was added and the resulting mixture was mixed for one hour. The resulting mixture was stirred for ten minutes under slight vacuum, cooled to room temperature, and packaged under anhydrous conditions. The material had the following composition:

| Component | Parts by Weight |
| --- | --- |
| Base polyurethane polymer | 100 |
| Solvent (methanol) | 8 |
| Carbon black | 40 |
| Thixotropic agent | 0.5 |
| A 1120 Aminosilane | 0.5 |
| AO 2246 Anti-oxidant | 0.5 |
| Dibutyl tin diacetate | 0.1 |
| N"'-[2-hydroxy-3-[3-(trimethoxysilyl)propoxy]-propyl]-N,N,N',N'-tetramethylguanidine accelerating agent | 0.4 |

Example 5

Preparation of Sealant Composition Containing Accelerator of Example 3

The procedure of Example 4 was followed to prepare a sealant material having the composition given below.

| Component | Parts by Weight |
| --- | --- |
| Base polyurethane polymer | 100 |
| Solvent (methanol) | 8 |
| Carbon black | 40 |
| Thixotropic agent | 0.5 |
| A 1120 Aminosilane | 0.5 |
| AO 2246 Anti-oxidant | 0.5 |
| Dibutyl tin diacetate | 0.1 |
| [3-(Triethoxysilyl)propyl]carbamic acid, [2-[[bis(dimethylamino)methylene]amino]-1-[[3-(trimethoxysilyl)propoxy]methyl]ethyl] ester accelerating agent | |

Example 6

Preparation of Sealant Composition Without an Accelerator of the Present Invention The procedure to Example 4 was followed to prepare a sealant material having the composition of Example 4, with the exception that no silyl-substituted guanidine accelerator was added. The material had the following composition:

| Component | Parts by Weight |
| --- | --- |
| Base polyurethane polymer | 100 |
| Solvent (methanol) | 8 |
| Carbon black | 40 |
| Thixotropic agent | 0.5 |
| A 1120 Aminosilane | 0.5 |
| AO 2246 Anti-oxidant | 0.5 |
| Dibutyl tin diacetate | 0.1 |
| Accelerating agent | None |

Example 7

Preparation of Sealant Composition of Example 4 But Lacking the Adhesion Promoter The procedure of Example 4 was followed to prepare a sealant material having the composition of Example 4, with the exception that the A 1120 aminosilane adhesion promoter was omitted to determine the affect of such omission on the behavior of the resulting sealant composition. The material had the following composition:

| Component | Parts by Weight |
| --- | --- |
| Base polyurethane polymer | 100 |
| Solvent (methanol) | 8 |
| Carbon black | 40 |
| Thixotropic agent | 0.5 |
| A 1120 Aminosilane | None |
| AO 2246 Anti-oxidant | 0.5 |
| Dibutyl tin diacetate | 0.1 |
| N"'-[2-hydroxy-3-[3-(trimethoxysilyl)propoxy]-propyl]-N,N,N',N'-tetramethylguanidine accelerating agent | 0.4 |

Example 8

Preparation of Sealant Composition of Example 4 Having Less Accelerator

The procedure of Example 4 was followed to prepare a sealant material having a lower concentration of the silyl-substituted guanidine accelerator. The material had the following composition:

| Component | Parts by Weight |
|---|---|
| Base polyurethane polymer | 100 |
| Solvent (methanol) | 8 |
| Carbon black | 40 |
| Thixotropic agent | 0.5 |
| A 1120 Aminosilane | 0.5 |
| AO 2246 Anti-oxidant | 0.5 |
| Dibutyl tin diacetate | 0.1 |
| N''-[2-hydroxy-3-[3-(trimethoxy-silyl) propoxy]-propyl]-N,N,N',N'-tetramethylguanidine accelerating agent | 0.2 |

Example 9

Preparation of Sealant Composition of Example 4 Having More Accelerator

The procedure of Example 4 was followed to prepare a sealant material having a higher concentration of the silyl-substituted guanidine accelerator. The material had the following composition:

| Component | Parts by Weight |
|---|---|
| Base polyurethane polymer | 100 |
| Solvent (methanol) | 8 |
| Carbon black | 40 |
| Thixotropic agent | 0.5 |
| A 1120 Aminosilane | 0.5 |
| AO 2246 Anti-oxidant | 0.5 |
| Dibutyl tin diacetate | 0.1 |
| N''-[2-hydroxy-3-[3-(trimethoxy-silyl)propoxy]-propyl]-N,N,N',N'-tetramethylguanidine accelerating agent | 0.8 |

We claim:

1. A one-component, moisture-curable sealant composition comprising a mixture of
(a) a silane-terminated polyurethane polymer of the formula

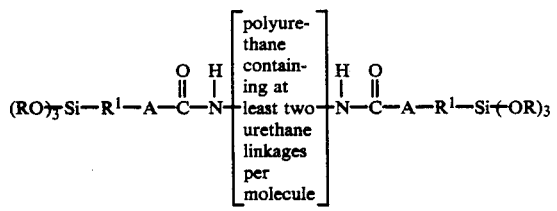

wherein
R is lower alkyl of from 1 to 6 carbon atoms;
$R^1$ is a divalent bridging radical selected from the group consisting of a divalent hydrocarbon radical, a divalent hydrocarbon ether radical, and a divalent hydrocarbon amino radical;
A is selected from the group consisting of —S— and —$NR^2$— where $R^2$ is hydrogen or alkyl of from one to six carbon atoms;
(b) from 0.2 to 1.0 parts by weight of an aminosilane per 100 parts by weight of said silane-terminated polyurethane polymer, said aminosilane having the structure

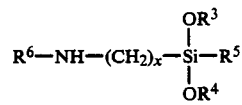

wherein
x is an integer of from one to three;
$R^3$ and $R^4$ may be the same or different and are selected from alkyl of from one to four carbon atoms;
$R^5$ is alkyl of from one to four carbon atoms or alkoxyl of from one to four carbon atoms;
$R^6$ is hydrogen or —$(CH_2)_yNHR^7$ wherein $R^7$ is hydrogen or 13 $(CH_2)_zNH_2$ and wherein y and z may be the same or different and are integers of from one to three;
(c) from 0.2 to 1.0 parts by weight of an accelerator per 100 parts by weight of said silane-terminated polyurethane polymer, said accelerator selected from the group consisting of compounds or mixtures thereof having the structure

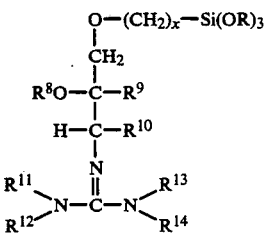

where x and R are as previously defined; $R^8$, is hydrogen or

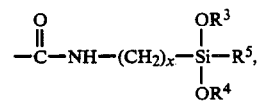

where $R^3$, $R^4$, $R^5$, and x are as defined above;
$R^9$ and $R^{10}$ are hydrogen or, when taken together with the carbon atoms to which they are attached, form a saturated six-membered carbocyclic ring; and
$R^{11}$, $R^{12}$, $R^{13}$, and $R^{14}$ are independently hydrogen or alkyl of from one to four carbon atoms.

2. A one-component, moisture-curable sealant composition as defined in claim 1 wherein said silane-terminated polyurethane polymer comprises a reaction product of: a polyether polyol contain at least two hydroxyl groups per molecule and a number average molecular weight of about 1000 to about 3000 and an isocyanate having at least two isocyanate groups per molecule.

3. A one-component, moisture-curable sealant composition as defined in claim 1 wherein said silane-terminated polyurethane polymer has a number average molecular weight of from about 10,000 to about 30,000.

4. A one-component, moisture-curable sealant composition as defined in claim 3 wherein A is —$NR^2$— where $R^2$ is as defined therein.

5. A one-component, moisture-curable sealant composition as defined in claim 1 wherein said composition comprises from 0.4 to 0.8 parts by weight of said aminosilane per 100 parts by weight of said silane-terminated polyurethane polymer.

6. A one-component, moisture-curable sealant composition as defined in claim 5 wherein said aminosilane is N-(beta-aminoethyl)-gamma-aminopropyl trimethoxysilane.

7. A one-component, moisture-curable sealant composition as defined in claim 1 wherein said composition comprises from 0.2 to 0.8 parts by weight of said accelerator per 100 parts by weight of said silane-terminated polyurethane polymer.

8. A one-component, moisture-curable sealant composition as defined in claim 1 wherein said accelerator is selected from the group consisting of
(a) N''-[2-hydroxy-3-[3-(trimethoxysilyl)propoxy]-propyl]-N,N,N',N'-tetramethylguanidine;
(b) N''-[2-hydroxy-3-[3-(ethoxydimethylsilyl)propoxy]-propyl]-N,N,N',N'-tetramethylguanidine;
(c) N''-[2-hydroxy-3-[3-(diethoxymethylsilyl)propoxy]-propyl]-N,N,N',N'-tetramethylguanidine;
(d) N''-[4 - [2-(trimethoxysilyl)ethyl]-2-hydroxycyclohexyl]-N,N,N',N'-tetramethylguanidine;
(e) [3-(triethoxysilyl)propyl]carbamic acid, [2-[[bis(-dimethylamino)methylene]amino]-1-[[3-(trimethoxysilyl)propoxy]methyl]ethyl] ester;
(f) [3-(triethoxysilyl)propyl]carbamic acid, [2-[[bis(-dimethylamino)methylene]amino]-1-[[3-(ethoxydimethylsilyl)propoxy]
(g) [3-(triethoxysilyl)propyl]carbamic acid, [2-[[bis(-dimethylamino)methylene]amino]-1-[[3-(diethoxymethylsilyl)propoxy]methyl]ethyl] ester; and
(h) [3-(triethoxysilyl)propyl]carbamic acid, [2-[[bis(-dimethylamino)methylene]amino]-5-[2-(trimethoxysilyl)ethyl]] ester.

9. A one-component, moisture-curable sealant composition as defined in claim 8 wherein said accelerator is N''-[2-hydroxy-3-[3-(trimethoxysilyl)propoxy]-propyl]-N,N,N',N'-tetramethylguanidine.

10. A one-component, moisture-curable sealant composition as defined in claim 8 wherein said accelerator is N''-[2-hydroxy-3-[3-(ethoxydimethylsilyl)propoxy]-propyl]-N,N,N',N'-tetramethylguanidine.

11. A one-component, moisture-curable sealant composition as defined in claim 8 wherein said accelerator is N''-[2-hydroxy-3-[3-(diethoxymethylsilyl)propoxy]-propyl]-N,N,N',N'-tetramethylguanidine.

12. A one-component, moisture-curable sealant composition as defined in claim 8 wherein said accelerator is N''-[4-[2-(trimethoxysilyl)ethyl]-2-hydroxycyclohexyl]-N,N,N',N'-tetramethylguanidine.

13. A one-component, moisture-curable sealant composition as defined in claim 8 wherein said accelerator is [3-(triethoxysilyl)propyl]carbamic acid, [2-[[bis(dimethylamino)methylene]amino]-1-[[3-(trimethoxysilyl)propoxy]methyl]ethyl] ester.

14. A one-component, moisture-curable sealant composition as defined in claim 8 wherein said accelerator is [3-(triethoxysilyl)propyl]carbamic acid, [2-[[bis(dimethylamino)methylene]amino]-1-[[3-(ethoxydimethylsilyl)propoxy]methyl]ethyl] ester.

15. A one-component, moisture-curable sealant composition as defined in claim 8 wherein said accelerator is [3-(triethoxysilyl)propyl]carbamic acid, [2-[[bis(dimethylamino)methylene]amino]-!-[[3-(diethoxymethylsilyl)propoxy]methyl]ethyl] ester.

16. A one-component, moisture-curable sealant composition as defined in claim 8 wherein said accelerator is [3-(triethoxysilyl)propyl]carbamic acid, [2-[[bis(dimethylamino)methylene]amino]-5-[2-(trimethoxysilyl)ethyl]] ester.

* * * * *